(12) United States Patent
Ayade

(10) Patent No.: US 12,066,812 B2
(45) Date of Patent: Aug. 20, 2024

(54) INFORMATION PROCESSING METHOD, INFORMATION PROCESSING SYSTEM, AND PROGRAM

(71) Applicant: LINKWIZ INCORPORATED, Shizuoka (JP)

(72) Inventor: Heev Ayade, Shizuoka (JP)

(73) Assignee: LINKWIZ INCORPORATED, Shizuoka (JP)

( * ) Notice: Subject to any disclaimer, the term of this patent is extended or adjusted under 35 U.S.C. 154(b) by 403 days.

(21) Appl. No.: 17/618,370

(22) PCT Filed: Jan. 27, 2021

(86) PCT No.: PCT/JP2021/002878
§ 371 (c)(1),
(2) Date: Dec. 10, 2021

(87) PCT Pub. No.: WO2021/181929
PCT Pub. Date: Sep. 16, 2021

(65) Prior Publication Data
US 2022/0253039 A1    Aug. 11, 2022

(30) Foreign Application Priority Data
Mar. 9, 2020  (JP) .................. 2020-040250

(51) Int. Cl.
*G05B 19/4093*  (2006.01)
*B25J 9/16*  (2006.01)
(Continued)

(52) U.S. Cl.
CPC ...... *G05B 19/40938* (2013.01); *B25J 9/1664* (2013.01); *B25J 9/1671* (2013.01); *G05B 19/21* (2013.01); *G05B 19/404* (2013.01)

(58) Field of Classification Search
CPC .............. G05B 19/40938; G05B 19/21; G05B 19/404; G05B 2219/34096;
(Continued)

(56) References Cited

U.S. PATENT DOCUMENTS

2006/0181700 A1* 8/2006 Andrews ............ G01N 21/4738
356/237.2
2016/0016312 A1* 1/2016 Lawrence, III ........ B25J 9/1671
901/41
(Continued)

FOREIGN PATENT DOCUMENTS

JP   H01177615 A   7/1989
JP   H05134737 A   6/1993
(Continued)

OTHER PUBLICATIONS

Examination Report dated Jun. 14, 2023 for Indian patent application No. 202127057487.
(Continued)

*Primary Examiner* — Ziaul Karim

(57) ABSTRACT

The easy and quick detection of a contour shape of an object from three dimensional point group data, and control a robotic arm and a tool using it. An information processing method comprising: a step of acquiring three-dimensional point group data by a sensor from an object, a step of specifying a contour point group data that constitutes a contour of the object from the three-dimensional point group data, a step of acquiring tool control information including tool position information and tool posture information for specifying a tool trajectory of the tool connected to the arm of the working robot from the contour point group data, and a step of controlling the tool based on the tool control information.

11 Claims, 15 Drawing Sheets

(51) Int. Cl.
    *G05B 19/21* (2006.01)
    *G05B 19/404* (2006.01)
(58) Field of Classification Search
    CPC ........... G05B 2219/36248; G05B 2219/37205;
          G05B 2219/40543; G05B 2219/40564;
          B25J 9/1664; B25J 9/1671; B25J 13/08;
          B25J 9/1694; Y02P 90/02; G06F 30/10
    See application file for complete search history.

(56) References Cited

U.S. PATENT DOCUMENTS

| | | | | |
|---|---|---|---|---|
| 2018/0204111 | A1* | 7/2018 | Zadeh | G06V 10/764 |
| 2018/0222049 | A1* | 8/2018 | Suzuki | B25J 9/161 |
| 2018/0250822 | A1* | 9/2018 | Shimodaira | B25J 9/1697 |
| 2018/0250823 | A1* | 9/2018 | Shimodaira | B25J 9/1612 |
| 2019/0033888 | A1* | 1/2019 | Bosworth | B64C 13/16 |

FOREIGN PATENT DOCUMENTS

| | | | |
|---|---|---|---|
| JP | 2000207557 A | 7/2000 |
| JP | 2002046087 A | 2/2002 |
| JP | 2008219188 A | 9/2008 |
| JP | 2010172969 A | 8/2010 |
| JP | 2011179909 A | 9/2011 |
| JP | 2013068417 A | 4/2013 |
| JP | 2014029664 A | 2/2014 |
| JP | 2015009324 A | 1/2015 |
| JP | 2018017654 A | 2/2018 |
| JP | 2018144160 A | 9/2018 |
| JP | 2020001109 A | 1/2020 |

OTHER PUBLICATIONS

European Search Report and Written Opinion dated May 23, 2023 for European Patent Application No. 21767948.9.

Mohit Vohra et al. "Real-time Grasp Pose Estimation for Novel Objects in Densely Cluttered Environment" 2019 28th IEEE International Conference on Robot and Human Interactive Communication (RO-MAN); Oct. 14, 2019; pp. 1-6.

Elmar de Koning, "Polyline Simplification" Code Project for those who code; Nov. 25, 2011; https://www.codeproject.com/Articles/114797/Polyline-Simplification; retrieved on May 11, 2023; pp. 1-30.

Notice of Reasons for Refusal dated Apr. 27, 2020 for Japanese Patent Application No. 2020-040250.

Notice of Reasons for Refusal dated Dec. 28, 2020 for Japanese Patent Application No. 2020-182270.

* cited by examiner

Three-dimensional point group data 41

Contour point group data 51

INFORMATION PROCESSING METHOD, INFORMATION PROCESSING SYSTEM, AND PROGRAM

TECHNICAL FIELD

The present disclosure relates to an information processing method, an information processing system, and program.

BACKGROUND ART

Conventionally, there has been a method of generating an arm trajectory data of a working robot based on CAD data of an object (see, e.g., Patent Literature 1).

PRIOR ART LIST

Patent Literature

Patent Literature 1: Japanese Unexamined Patent Publication No. 2002-46087

SUMMARY OF THE INVENTION

Technical Problem

However, when CAD drawing data is used as CAD data, the shape of the CAD data of the object may not match with the shape of an actual object. Alternatively, when the CAD data is created from scan data of an actual object (for example, three-dimensional point group data), the error between the two would be reduced, but it is not useful for the user since it is necessary to create CAD data from the scan data because of the additional man-hours thereon it would take.

In addition, even if an attempt is made to directly generate arm trajectory data from the three-dimensional point group data, the three-dimensional point group data is simply a collection of point data, and therefore, it is difficult to determine the contour shape of the object from the point group data. For this reason, there are cases where it is necessary for the user to manually teach the arm trajectory.

The present disclosure has been designed in view of the above-mentioned circumstances, and the purpose of the present disclosure is to provide a technique that can easily and quickly detect the contour shape of an object from three-dimensional point group data and control robotic arms and tools by using it.

Technical Solution

The main invention of the present disclosure for achieving the above object provides an information processing method comprising: a step of acquiring three-dimensional point group data by a sensor from an object, a step of specifying contour point group data that constitutes the contour of the object from the three-dimensional point group data, a step of acquiring tool control information including a tool position information and a tool posture information for specifying a tool trajectory of a tool connected to an arm of a working robot from the contour point group data, and a step of controlling the tool based on the tool control information.

Other problems disclosed in the present disclosure and technical solutions thereof will be clarified in the embodiments of the present disclosure and the accompanying figures.

Advantageous Effects

According to the present disclosure, it is possible to easily and quickly detect the contour shape of an object from a three-dimensional point group data, and control robotic arms and tools using it.

DETAILED DESCRIPTION OF THE EMBODIMENTS

Figure 1:
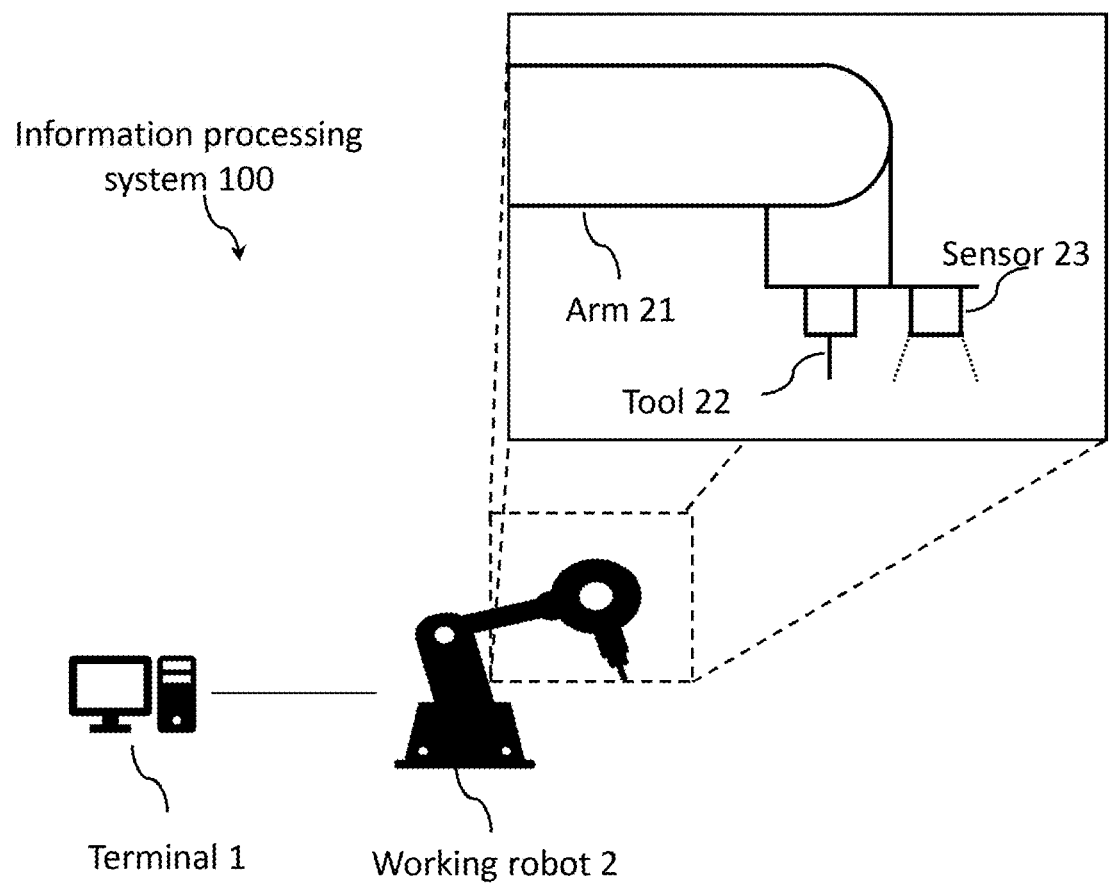
FIG. 1 is showing an overall configuration example of an information processing system 100 according to the embodiment of the present disclosure.

The contents of the embodiment of the present disclosure will be listed and described. The present disclosure has, for example, the following configuration.

[Item 1]

An information processing method comprising:
    a step of acquiring first three-dimensional point group data by a sensor from a first object,
    a step of specifying first contour point group data that constitutes an entire contour of the object from the first three-dimensional point group data, based on the mutual positional relationship of the point data within the first three-dimensional point group data, a step of specifying predetermined point data among the first contour point group data as point data of the reference point in a comparative object setting range that defines a predetermined range including at least a reference point, a step of storing the first contour point group data belonging to the predetermined range as feature point data of the first object, a step of acquiring second three-dimensional point group data by a sensor from a second object, a step of storing the second three-dimensional point group data belonging to the predetermined range as feature point data of the second object, and a step of comparing the feature point data of the first object with the feature point data of the second object to calculate a deviation amount, wherein the reference point is a center point of the comparative object setting range, and the comparative object setting range is a range constituted of a spherical body having a predetermined radius from the point data of the center point.

[Item 2]

The information processing method as set forth in Item 1, further comprising:

a step of acquiring tool control information including a tool position information and a tool posture information for specifying a tool trajectory of a tool connected to an arm of a working robot based on at least the first contour point group data, and a step of controlling the tool based on the tool control information, wherein the step of acquiring the tool control information comprises a step of setting a moving range of the tool.

[Item 3]

The information processing method as set forth in Item 2, wherein:

the step of acquiring the tool control information comprises a step of acquiring the tool position information by specifying the first contour point group data within the moving range of the tool as the tool position coarsely in the straight line portion and densely in the curved portion.

[Item 4]

The information processing method as set forth in any one of Items 1 to 3, wherein the step of specifying the first contour point group data comprises:

a step of selecting one point data from the first three-dimensional point group data, a step of drawing a line segment from the selected point data for each of the points contained inside a circle having a predetermined radius centering on the selected point data, a step of calculating the angle formed by two line segments adjacent to each other in a predetermined rotation direction centering on the selected point data among a plurality of the line segments, a step of comparing the calculated angle with a set value, a step of determining the selected point data as the first contour point group data when it is determined that the calculated angle is larger than the set value.

[Item 5]

An information processing method comprising:

a step of acquiring three-dimensional point group data by a sensor from an object, a step of specifying contour point group data that constitutes the contour of the object from the three-dimensional point group data, a step of acquiring tool control information including a tool position information and a tool posture information for specifying a tool trajectory of a tool connected to an arm of a working robot from the contour point group data, and a step of controlling the tool based on the tool control information.

[Item 6]

The information processing method of Item 5, wherein the step of acquiring the tool control information comprises:

a step of setting a moving range of the tool, and a step of acquiring the tool position information by specifying the contour point group data within the moving range of the tool as the tool position for each fixed number.

[Item 7]

The information processing method of Item 5, wherein the step of acquiring the tool control information comprises:

a step of setting a moving range of the tool, and a step of acquiring the tool position information by specifying the contour point group data within the moving range of the tool as the tool position coarsely in the straight line portion and densely in the curved portion.

[Item 8]

The information processing method of Item 6 or 7, wherein the step of acquiring the tool control information further comprises:

a step of calculating the surface normal vector of the point data specified as the tool position, and a step of acquiring the direction of the surface normal vector as tool posture information in the point data.

[Item 9]

The information processing method of any one of Items 5 to 8, further comprising:

a step in which a user edits the tool position information or the tool posture information.

[Item 10]

The information processing method of any one of Items 5 to 9, further comprising:

a step of storing feature point data in the contour point group data, wherein the object is a first object, and an object different from the first object is a second object, a step of acquiring three-dimensional point group data from the second object, specifying contour point group data, and storing feature point data, and wherein the feature point data of the first object is compared with the feature point data of the second object to calculate the amount of deviation, and the positional deviation of the coordinate data relating to the first object is corrected based on the amount of deviation.

[Item 11]

The information processing method of Item 10, wherein the position deviation of the tool position information is corrected as the correction of the position deviation.

[Item 12]
The information processing method of Item 10 or 11, wherein the step of storing the feature point data comprises:
a step of specifying predetermined point data of the contour point group data of the first object as point data of the center point of a comparative object setting range that defines a predetermined range including at least the center point,
a step of storing the contour point group data of the first object belonging to the predetermined range as the feature point data of the first object, and
a step of storing the point group data of the second object belonging to the predetermined range as the feature point data of the second object.

[Item 13]
An information processing system, comprising:
a three-dimensional point group data acquisition unit that acquires first three-dimensional point group data by a sensor from a first object and acquires second three-dimensional point group data by a sensor from a second object,
a boundary processing unit that specifies first contour point group data that constitutes a contour of the entire first object from the first three-dimensional point group data, based on the mutual positional relationship of the point data within the first three-dimensional point group data,
a correction control unit, which:
specifies predetermined point data among the first contour point group data as point data of the reference point in a comparative object setting range that defines a predetermined range including at least the reference point,
stores the first contour point group data belonging to the predetermined range as feature point data of the first object,
stores the second three-dimensional point group data belonging to the predetermined range as feature point data of the second object, and
calculates the amount of deviation by comparing the feature point data of the first object with the feature point data of the second object.

[Item 14]
An information processing system, comprising:
a three dimensional point group data acquisition unit that acquires three dimensional point group data by a sensor from an object,
a boundary processing unit that specifies contour point group data that constitutes a contour of the object from the three-dimensional point group data, and
a tool control unit that acquires tool control information including tool position information and tool posture information for specifying a tool trajectory of the tool connected to an arm of a working robot from the contour point group data, and controls the tool based on the tool control information.

[Item 15]
A program for making a computer execute an information processing method, the program being an information processing method comprising:
a step of acquiring first three-dimensional point group data by a sensor from a first object,
a step of specifying first contour point group data that constitutes an entire contour of the object from the first three-dimensional point group data, based on the mutual positional relationship of the point data within the first three-dimensional point group data,
a step of specifying predetermined point data among the first contour point group data as point data of the reference point in a comparative object setting range that defines a predetermined range including at least the reference point,
a step of storing the first contour point group data belonging to the predetermined range as feature point data of the first object,
a step of acquiring second three-dimensional point group data by a sensor from a second object,
a step of storing the second contour point group data belonging to the predetermined range as feature point data of the second object, and
a step of comparing the feature point data of the first object with the feature point data of the second object to calculate a deviation amount,
wherein the reference point is a center point of the comparative object setting range, and
the comparative object setting range is a range constituted of a spherical body having a predetermined radius from the point data of the center point.

[Item 16]
A program for making a computer execute an information processing method, the program being an information processing method comprising:
a step of acquiring three-dimensional point group data by a sensor from an object,
a step of specifying a contour point group data that constitutes a contour of the object from the three-dimensional point group data,
a step of acquiring tool control information including tool position information and tool posture information for specifying a tool trajectory of a tool connected to an arm of a working robot from the contour point group data, and
a step of controlling the tool based on the tool control information.

[Item 17]
An information processing method, comprising
a step of acquiring three-dimensional point group data by a sensor from an object, and
a step of specifying a contour point group data that constitutes a contour of the object from the three-dimensional point group data.

Details of Embodiments

Specific examples of the information processing system 100 according to an embodiment of the present invention will be described below with reference to the accompanying drawings. Also, it should be noted that the present disclosure not limited to these examples, but expressed by the claims of the patent, which are intended to include all alterations within the implication and scope equivalent to those of the claims of the patent. In the following description, the same or similar reference numerals and names in the accompanying drawings refer to the same or similar elements, and in the description of each embodiment, duplicate description of the same or similar elements may be omitted. In addition, the features shown in each embodiment can be applied to other embodiments as long as they do not contradict each other.

FIG. 1 is showing an overall configuration example of the information processing system 100 according to the embodiment of the present disclosure.

As shown in FIG. 1, the information processing system 100 of the embodiment of the present disclosure has a terminal 1 and a working robot 2. The working robot 2 has at least an arm 21, a tool 22, and a sensor 23. The terminal 1 and the working robot 2 are connected so as to be communicated with each other by wire or wirelessly.

<Terminal 1>

Figure 2:
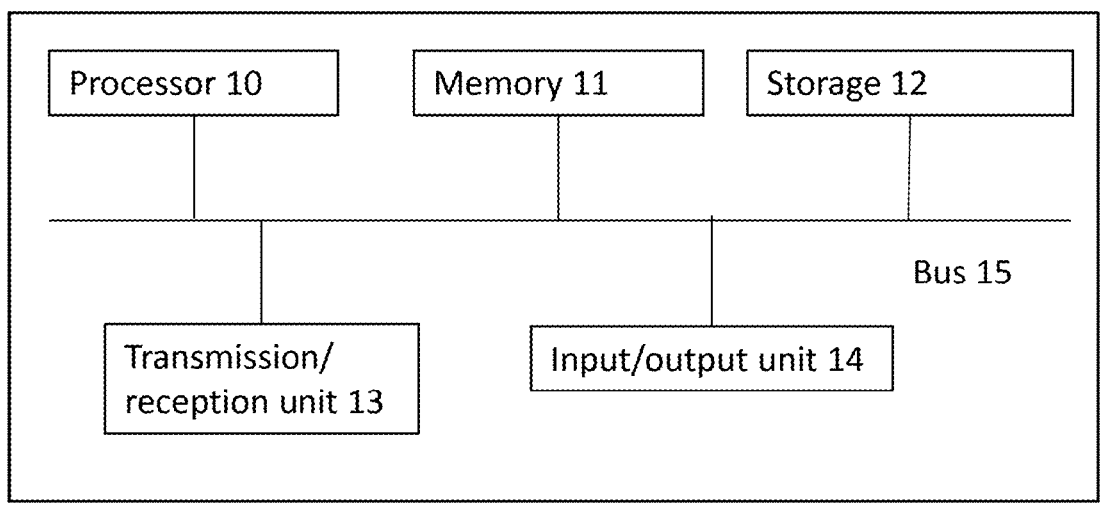
FIG. 2 is a diagram showing a hardware configuration example of the terminal 1 according to the embodiment of the present disclosure.

FIG. 2 is a diagram showing a hardware configuration example of a terminal 1. The terminal 1 may be a general-purpose computer such as a personal computer, or may be logically implemented by cloud computing. Further, the illustrated configuration is an example, and may have other configurations.

The terminal 1 includes at least a processor 10, a memory 11, a storage 12, a transmission/reception unit 13, an input/output unit 14, and the like, and these are electrically connected to each other through a bus 15.

The processor 10 is an arithmetic unit that controls the operation of the entire terminal 1, at least controls the transmission and reception of data and the like with the working robot 2, and performs information processing required for application execution and authentication processing. For example, the processor 10 is a CPU (central processing unit) and/or a GPU (graphics processing unit). Each information processing is performed by executing a program or the like for this system stored in the storage 12 and deployed on the memory 11.

The memory 11 includes a main memory composed of a volatile storage device such as a DRAM (dynamic random-access memory), or the like and an auxiliary memory composed of a non-volatile storage device such as a flash memory or an HDD (hard disk drive), or the like. The memory 11 is used as a work area or the like of the processor 10, and also stores a BIOS (basic input/output system) executed when the terminal 1 is started, and various setting information, and the like.

The storage 12 stores various programs such as application programs. A database having data stored thereon used for each processing can be constructed in the storage 12.

The transmission/reception unit 13 connects the terminal 1 to at least the working robot 2 and performs transmission and reception of data and the like in accordance with the instructions of the processor. Further, the transmission/reception unit 13 is configured by wire or wirelessly, and in the case of wireless, for example, it may be configured by a short-range communication interface of WiFi, Bluetooth (registered trademark), and BLE (Bluetooth Low Energy).

The input/output unit 14 is an information input device such as a keyboard and a mouse, and an output device such as a display.

The bus 15 is commonly connected to the above each element and transmits, for example, an address signal, a data signal, and various control signals.

<Working Robot 2>

Returning to FIG. 1, the working robot 2 according to the embodiment of the present disclosure will be described.

As described above, the working robot 2 has the arm 21, the tool 22, and the sensor 23. Further, the illustrated configuration is an example, and may have other configurations.

The arm 21 controls its operation by the terminal 1 based on the three-dimensional robot coordinate system. Further, the arm 21 may further include a controller (not shown) connected to the working robot 2 by wire or wirelessly, thereby controlling the operation thereof.

The tool 22 controls its operation by the terminal 1 based on the three-dimensional tool coordinate system. Further, the configuration of the tool 22 may include any tool in accordance with applications, and may be, for example, a welding torch, a paint spraying device for paint, a gripping device, an excavation device, a polishing device, or the like.

Figure 4:
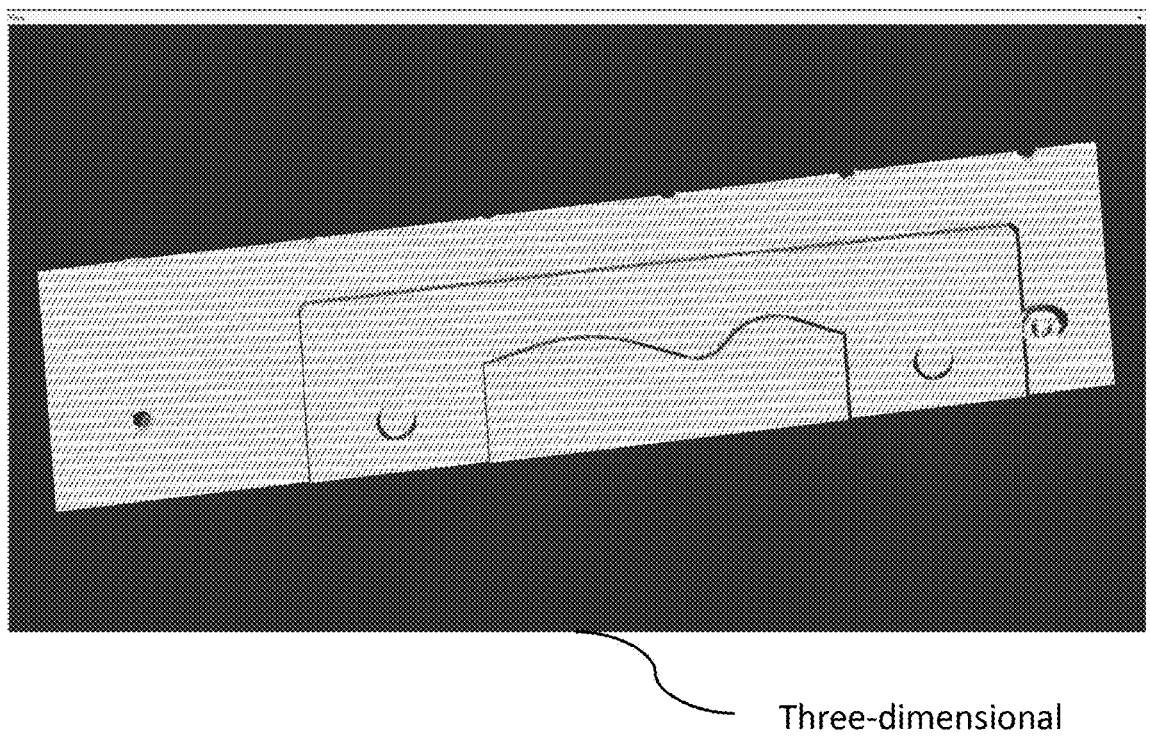
FIG. 4 is showing a display example of three-dimensional point group data according to the embodiment of the present disclosure.

The sensor 23 senses an object based on the three-dimensional sensor coordinate system. The sensor 23 is, for example, a laser sensor that operates as a three-dimensional scanner, and acquires three-dimensional point group data of the object by sensing. The three-dimensional point group data is, for example, as shown in FIG. 4, and each point data has sensor coordinates, and the shape of the object can be grasped from the point group.

Further, more specifically, a predetermined calibration is performed before the execution of the work, and the robot coordinate system, the tool coordinate system, and the sensor coordinate system are correlated with each other, for example, the user specifies the position based on the sensor coordinate system, whereby the arm 21 and the tool 22 may be configured so that the operation is controlled based on the corresponding positions.

<Function of Terminal 1>

Figure 3:
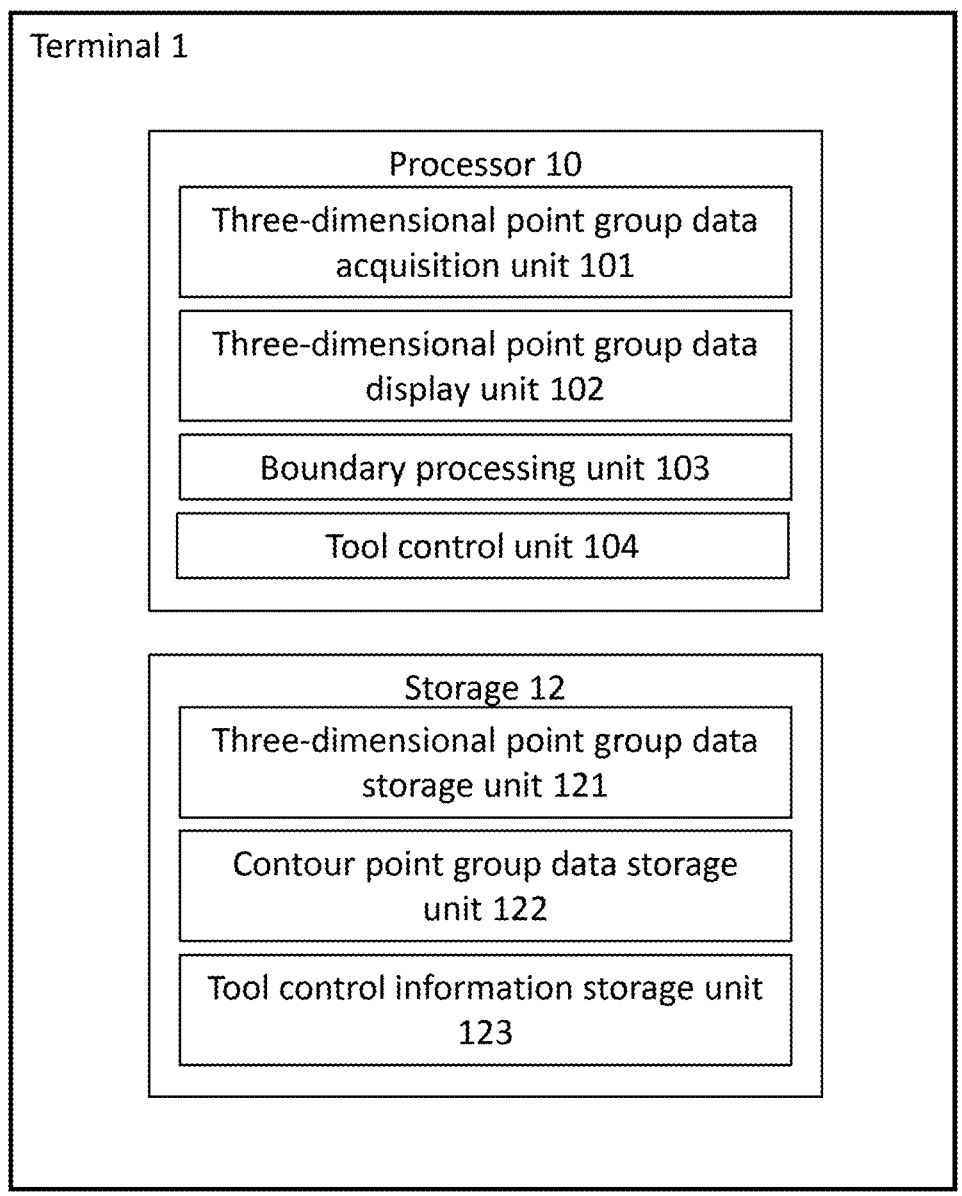
FIG. 3 is a diagram showing a functional configuration example of the terminal 1 according to the embodiment of the present disclosure.

FIG. 3 is a block diagram showing the functions implemented on the terminal 1. In the embodiment of the present disclosure, the processor 10 of the terminal 1 has a three-dimensional point group data acquisition unit 101, a three-dimensional point group data display unit 102, a boundary processing unit 103, and a tool control unit 104. Further, the storage 12 of the terminal 1 has a three-dimensional point group data storage unit 121, a contour point group data storage unit 122, and a tool control information storage unit 123.

The three-dimensional point group data acquisition unit 101 controls the working robot 2 in accordance with an instruction from the input/output unit 14 of the terminal 1, and acquires the three-dimensional point group data of the object by the sensor 23. The acquired three-dimensional point group data is, for example, three-dimensional coordinate information data based on the sensor coordinate system, and is stored in the three-dimensional point group data storage unit 121.

The three-dimensional point group data display unit 102 displays the three-dimensional point group data acquired by the three-dimensional point group data acquisition unit 101, for example, on the input/output unit 14 of the terminal 1 as shown in FIG. 4. The user can visually recognize the displayed three-dimensional point group data from an arbitrary direction, and for example, can specify the arbitrary direction by an information input device such as a keyboard and a mouse connected to the input/output unit 14.

Figure 5:
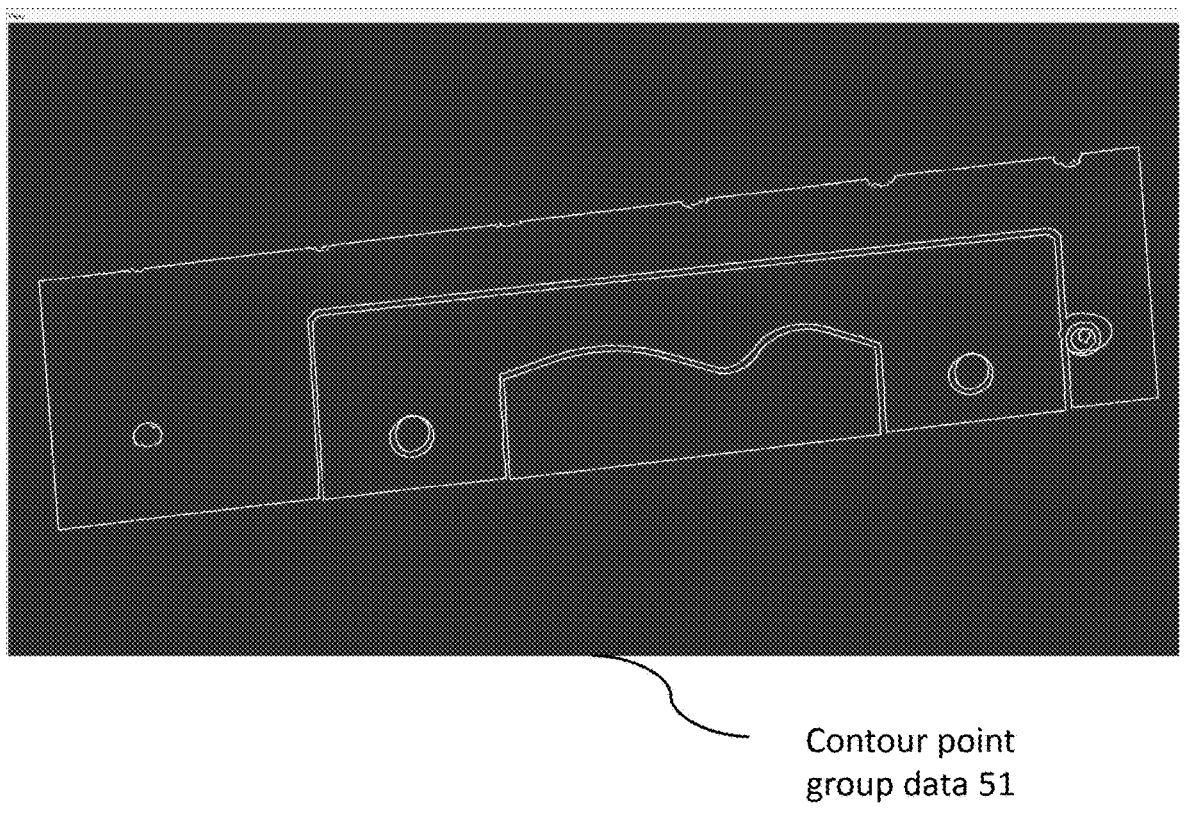
FIG. 5 is showing a display example of contour point group data according to the embodiment of the present disclosure.

The boundary processing unit 103 performs processing so that only the contour point group data 51 that constitutes the contour of the three-dimensional point group data remains as shown in FIG. 5 based on the three-dimensional point group data 41 as shown in FIG. 4. Like the three-dimensional point group data, the contour point group data is, for example, three-dimensional coordinate information data based on the sensor coordinate system, and is stored in the contour point group data storage unit 122. Further, the contour point group data is displayed on the input/output unit 14 of the terminal 1 by the contour point group data display unit (not shown) like the three-dimensional point group data. One example of a specific processing method of the boundary processing unit 103 will be described later.

The tool control unit 104 calculates tool control information including one or more position information and posture information of the tool 22 for the object based on the tool movement range, tool movement interval, and contour point group data, and moves the tool 22 based on the calculated tool control information. That is, in the tool control unit 104 of the processor 10 or other configurations (not shown), arm trajectory data for operating the arm 21 according to the tool trajectory data is generated based on the tool control information corresponding to the so-called tool trajectory data. One example of a specific calculation method of the tool control unit 104 will be described later.

<Flowchart of Information Processing Method>

Figure 6:
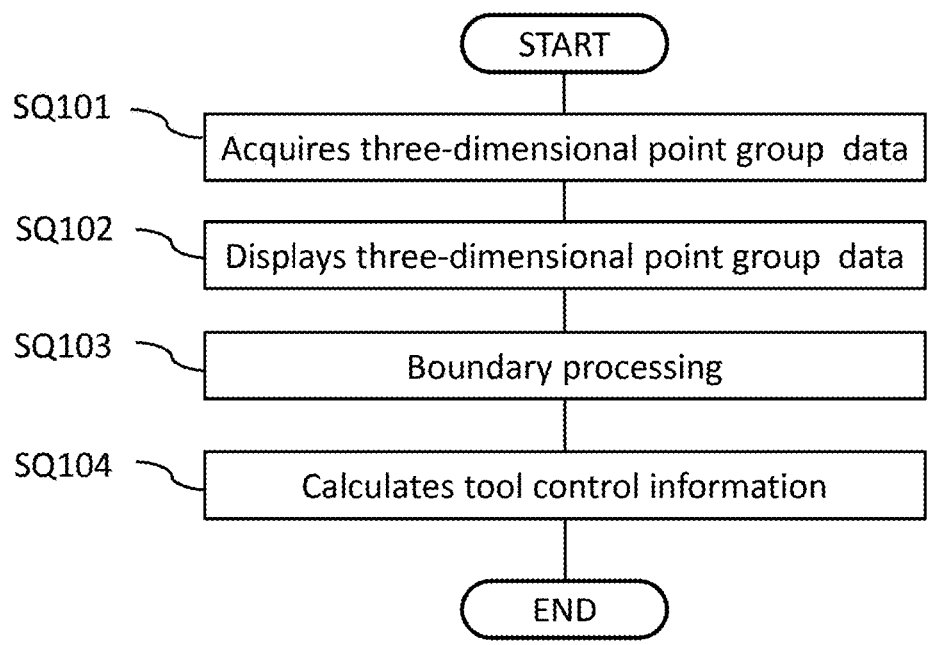
FIG. 6 is a diagram showing a flowchart example of an information processing method according to the embodiment of the present disclosure.

FIG. 6 is a diagram showing a flowchart example of an information processing method according to the embodiment of the present disclosure.

First, the user operates the working robot 2 by the terminal 1 or a controller (not shown), and acquires three-dimensional point group data of the object located on a work table, for example, by the sensor 23 (SQ101), based on the control by the three-dimensional point group data acquisition unit 101 of the terminal 1.

Next, the three-dimensional point group data acquired is displayed by the three-dimensional point group data display unit 102 on the terminal 1 (SQ102).

Next, the boundary processing unit 103 processes the contour point group data so as to generate it from the three-dimensional point group data, and displays it on the terminal 1 (SQ103).

Next, the tool control unit 104 calculates tool control information including one or more position information and posture information of the tool 22 for the object based on the tool movement range, tool movement interval, and contour point group data, and moves the tool 22 based on the calculated tool control information (SQ104).

Therefore, the information processing system 100 of the embodiment of the present disclosure can easily and quickly detect the contour shape of the object from the three-dimensional point group data, and control the robot arm using the contour shape.

<Flowchart of Boundary Processing Method>

Figure 7:
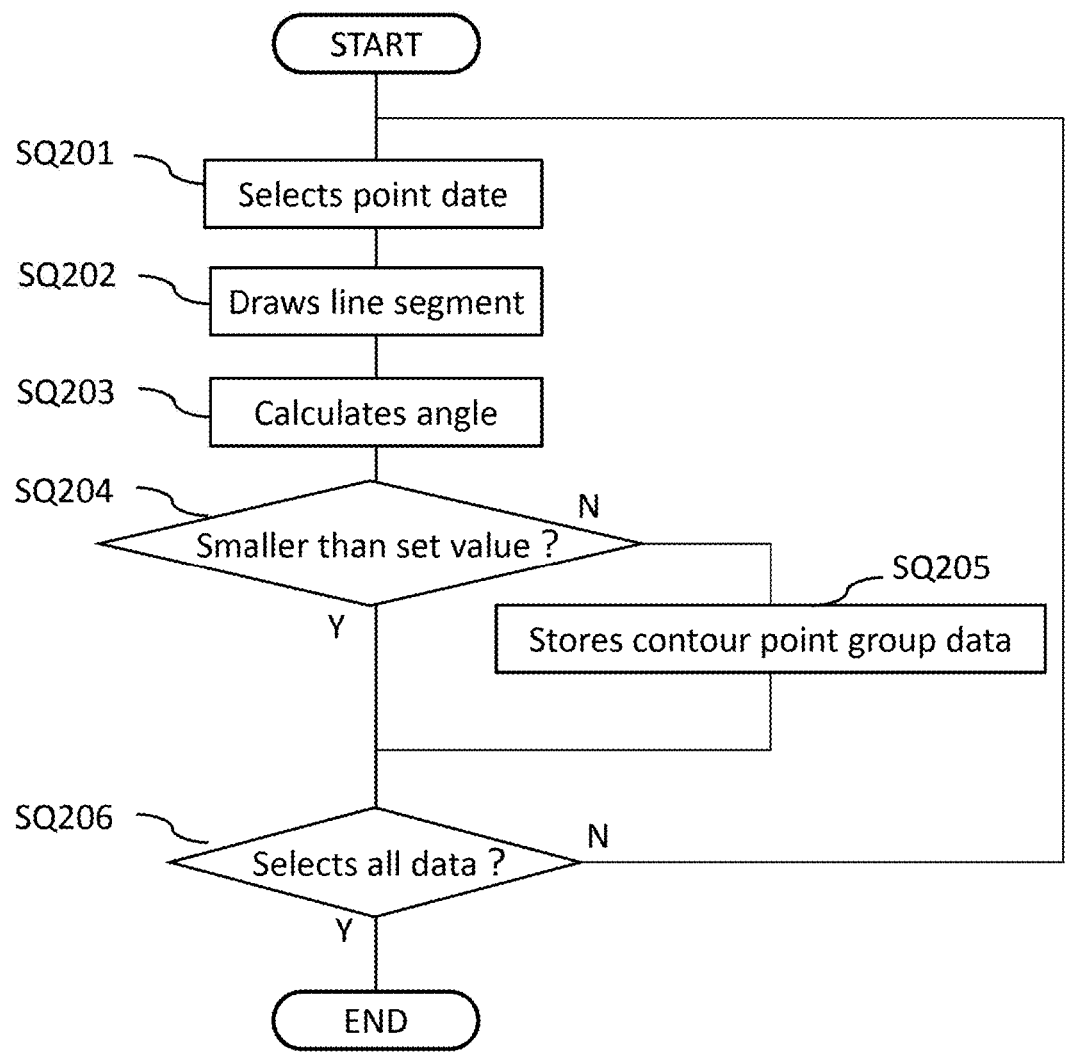
FIG. 7 is a diagram showing a flowchart example of a boundary processing method according to the embodiment of the present disclosure.

FIG. 7 is an example of a more detailed flowchart of the boundary processing method SQ103 in the information processing system 100 of the embodiment of the present disclosure.

First, the boundary processing unit 103 selects one point data from the three-dimensional point group data (SQ201).

Next, the boundary processing unit 103 draws a line segment from the selected point data for each of the points included inside the circle having a predetermined radius centering on the selected point data (SQ202).

Next, among the plurality of the line segments, for example, the angle formed by two line segments adjacent to each other in a predetermined rotation direction centering on the selected point data is calculated (SQ203).

Next, it is determined whether or not any of the calculated angles is smaller than the set value set by the user (SQ204).

Figure 8:
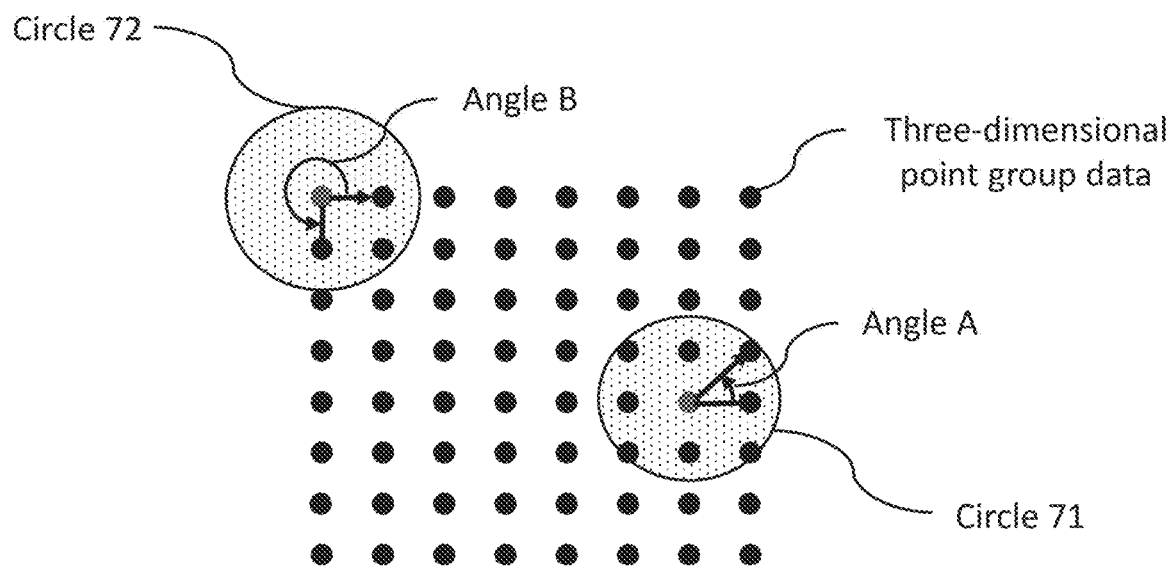
FIG. 8 is showing an example of a boundary processing method according to the embodiment of the present disclosure.

More specifically, in FIG. 8, for example, when the user's set value is set to 100°, it is determined that the angle formed by any two adjacent line segments in the circle 71 is smaller than the set value (A<100°) like the angle A (Yes), and it is determined that there is an angle having a value (B>100°) larger than the set value in the circle 72, such as the angle B (No).

Here, when it is determined as No, the selected point data is stored in the contour point group data storage unit 122 as the contour point group data (SQ205).

Then, when it is determined to be Yes, or after the end of SQ205, it is determined whether or not all the point data have been selected, and if it is determined to be No, the process returns to SQ201, and if it is determined to be Yes, the process ends (SQ206).

Therefore, the information processing system 100 of the embodiment of the present disclosure can easily and quickly detect the contour point group data constituting the contour shape of the object from the three-dimensional point group data, for example, by the boundary processing method described above.

In addition to the flowchart of FIG. 7, for example, after SQ206, only the contour point group data may be displayed on the input/output unit 14 of the terminal 1. Also, for example, at the timing before or after SQ206, the point group data that was not regarded as the contour point group data is deleted from the three-dimensional point group data, and the three-dimensional point group data display unit 102 can display the three-dimensional point group data corresponding to the contour point group data on the input/output unit 14 of the terminal 1. In this way, for example, only the contours of the three-dimensional point group data can be displayed, as shown in FIG. 5.

<Calculation method of Tool Control Information>

Figure 9:
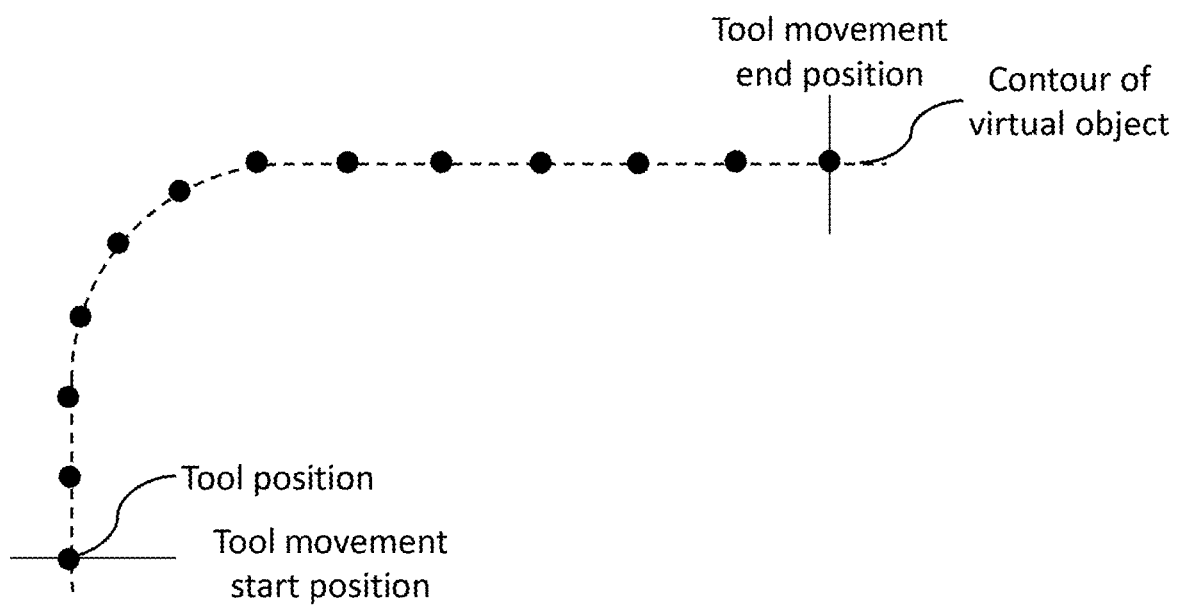
FIG. 9 is showing an example of a tool control information calculation method according to the embodiment of the present disclosure.

FIG. 9 is an example of the tool control information calculation method SQ104 in the information processing system 100 of the embodiment of the present disclosure.

First, regarding the tool position information, for example, as shown in FIG. 9, the tool moving range (for example, specified by the tool movement start position and the tool movement end position) is set, and the contour point group data is specified within the tool moving range as the tool position for each fixed number by the tool control unit 104, and thereby, tool position information can be obtained at a regular interval along the contour. Information about a part of the contour point group data specified as the tool position is stored in the tool control information storage unit 123 as the tool position information. Thereby, the tool position information can be specified by a simple process. Further, the contour (dotted line) of the virtual object is displayed to facilitate understanding, but it does not have to be displayed when it is displayed on the actual terminal 1. Further, the tool position is specified at the tool movement start position and the tool movement end position, but the adjacent contour point group data can be specified.

Figure 10:
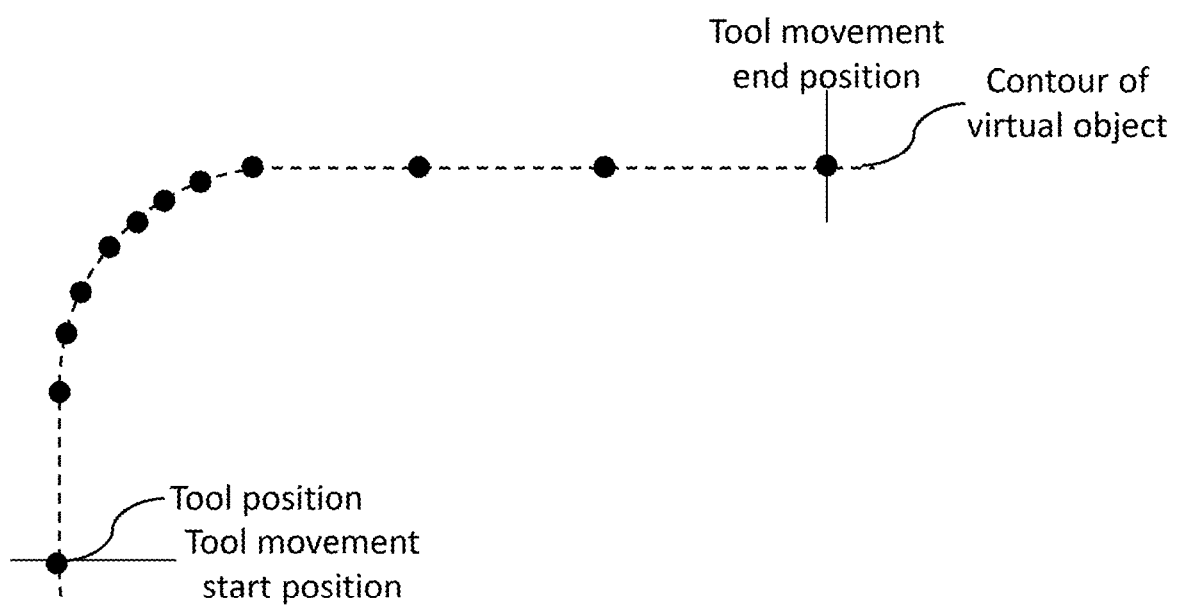
FIG. 10 is showing another example of the tool control information calculation method according to the embodiment of the present disclosure.

Further, for example, as shown in FIG. 10, the tool movement range is set, and the tool control unit 104 can coarsely and densely specify the contour point group data within the tool moving range as the tool position in the straight-line portion and the curved portion of the object contour. Since the tool 22 moves linearly between the tool positions, the tool position interval may be wide in the straight-line portion, but it is more preferable that the tool position interval is narrow in the curved portion in order to draw a tool trajectory that approximates the curve.

Figure 11:
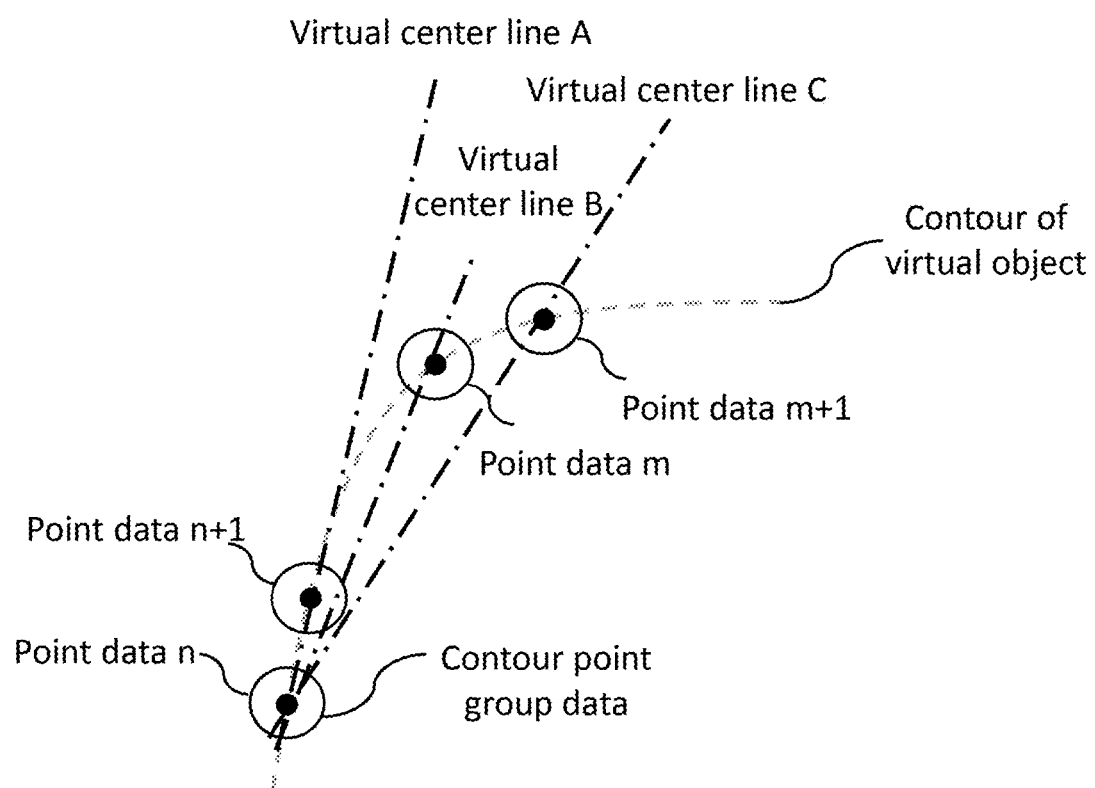
FIG. 11 is showing another example of the tool control information calculation method according to the embodiment of the present disclosure.

For coarsely and densely specifying, for example, it may be determined whether or not the angle formed by the two virtual center lines connecting the reference point data and the two point data in the contour point group data is equal to or larger than the reference value. For example, as shown in FIG. 11, when the point data n of the contour point group data is used as the reference point data, a line connecting the center of the point data n and the center of the point data n+1 adjacent to the point data n is defined as a virtual center line A, a line connecting the center of the point data n and the center of the predetermined point data m is defined as a virtual center line B, and a line connecting the center of the point data n and the center of the predetermined point data m+1 is defined as a virtual center line C. Further, for example, when the angle formed by the virtual center line A and the virtual center line B is less than the reference value, the point data m is not stored in the tool control information storage unit 123 as the tool position. On the other hand, for example, when the angle formed by the virtual center line A and the virtual center line C is equal to or larger than the reference value, the point data m+1 is stored in the tool control information storage unit 123 as the tool position. Further, since the position of the point data n+1 is usually close to the position of the point data n, it is not necessary to adopt the point data n+1 as the tool position.

Further, next, the point data m+1 is used as the reference point data, and the point data is sequentially determined in the same manner, and this is repeated to specify the tool position. Thereby, the tool control unit 104 can easily draw a tool trajectory closer to the contour shape of the object.

Further, the point data stored as the tool position may be displayed on the terminal 1 so that the user can confirm it. At that time, for example, the point data stored as the tool position and the other point data are color-coded and displayed distinguishably. For example, the user can delete the point data stored as the tool position, and may optionally edit it by specifying the tool position from other point data. Consequently, the arm can be more accurately controlled.

Figure 12:
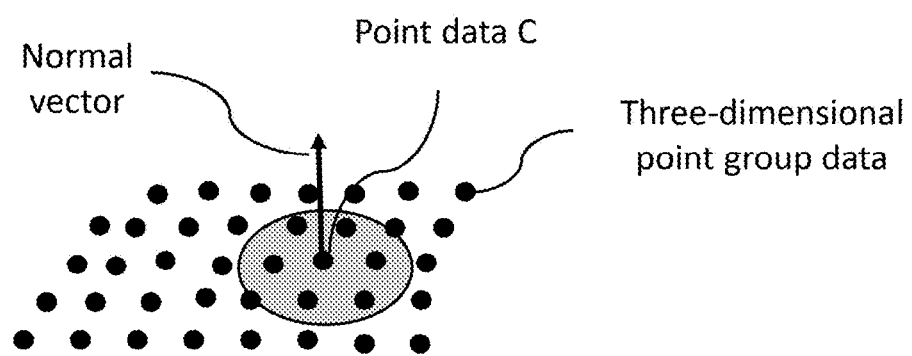
FIG. 12 is showing an example of a tool control information calculation method according to the embodiment of the present disclosure.

Next, regarding the tool posture information, for example, as shown in FIG. 12, in the point data C stored in the tool control information storage unit 123 as the tool position, the surface normal vector is calculated from the peripheral point group data (for example, point group data adjacent to point data C). The direction along the surface normal vector is stored in the tool control information storage unit 123 as tool posture information. Consequently, the tool 22 can be aligned perpendicular to the surface of the object at the tool position.

The tool posture may also be recognizably displayed on the terminal 1. At that time, the tool posture may be arbitrarily changed by the user. Consequently, the arm can be more accurately controlled.

<Example of Fitting>

In the information processing system 100 of the embodiment of the present disclosure, when the work associated with the type of the tool 22 is sequentially performed on a plurality of objects having the same or similar shape by using the tool trajectory information (tool control information including tool position information and tool posture information) for a predetermined object (hereinafter referred to as the "first object") stored by the tool control unit 104, sensing may be performed once by the sensor 23 before the operation of the tool to account for positional misalignment.

At this time, in the second object, for example, the contour point group data of the first object when the tool control information is acquired can be compared with the point group data of the second object acquired before the work to execute an operation (fitting) for correcting the positional deviation. Further, the point group data of the second object may be three-dimensional point group data, or may be the point group data obtained by thinning the three-dimensional point group data by a certain ratio, or it may be the contour point group data after the boundary processing.

Figure 13:
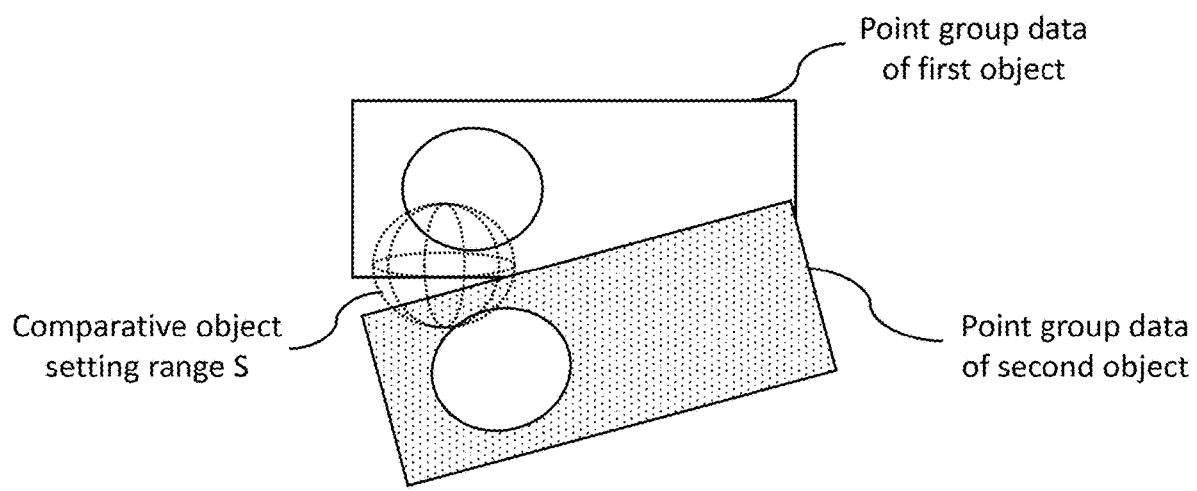
FIG. 13 is a schematic diagram showing an example of a fitting method according to the embodiment of the present disclosure.

For example, each point group data as shown in FIG. 13 can be obtained from the first object and the second object. More specifically, the comparison method for correcting the positional deviation between the two may, for example, compare the feature point data of each object.

Figure 14:
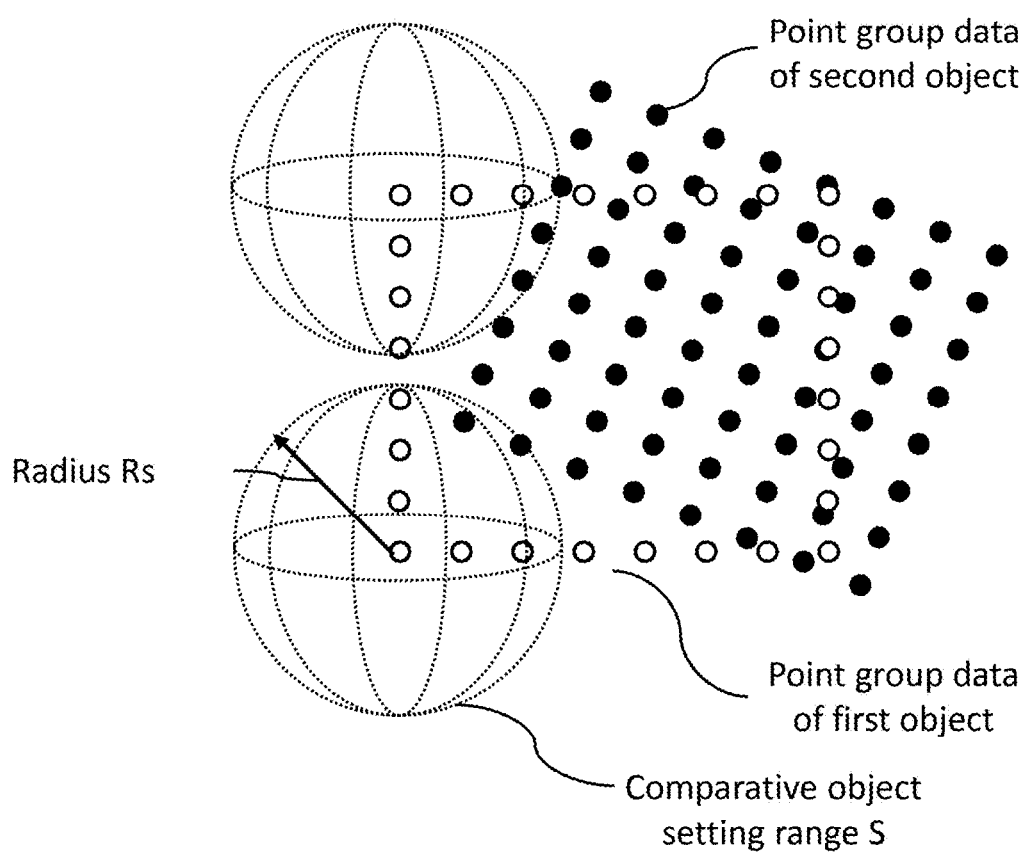
FIG. 14 is a detailed view showing an example of a fitting method according to the embodiment of the present disclosure.

The specifying method for storing the feature point data in each object is as follows as an example. First, the processor 10 sets a predetermined point data of the contour point group data (point data in white in FIG. 14) of the first object, for example, as point data of the center point of a comparison target setting range that defines a predetermined range including at least a center point. In FIG. 14, two ranges constituted of a spherical body having a radius Rs from the point data of the center point are shown as comparison target setting ranges S. The shape of the comparison target setting range S may be any shape (for example, a point, a cube, a rectangular parallelepiped, a prism, a cylinder, an ellipsoid, etc.), and the number of the comparative object setting range S may be any number.

Figure 15:
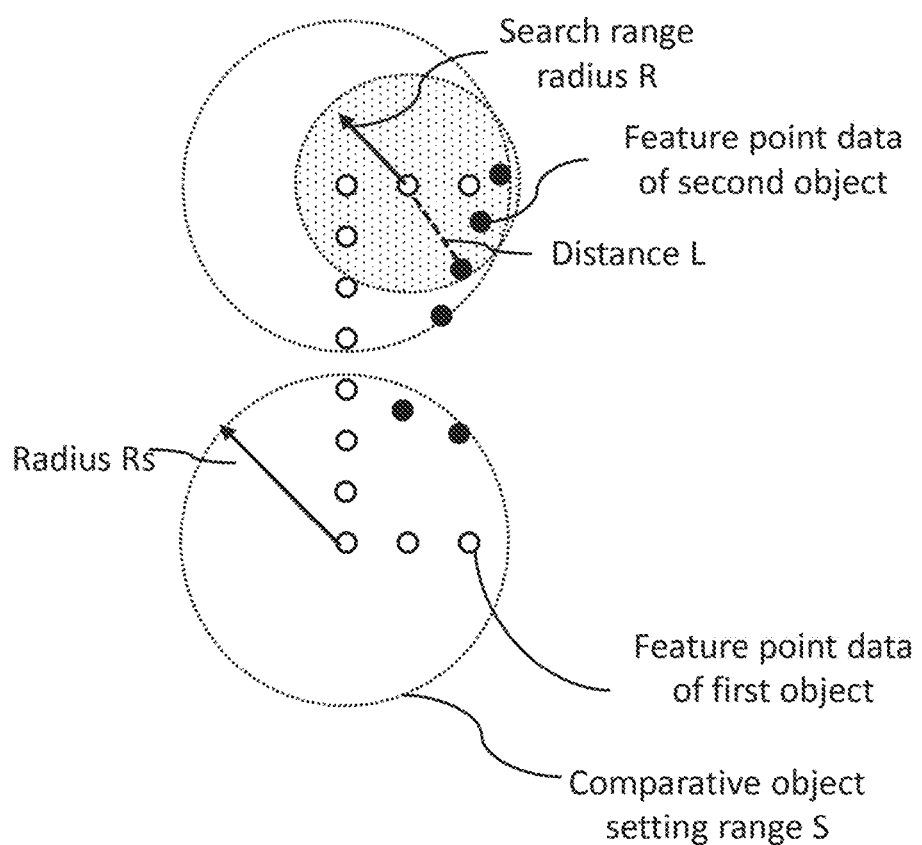
FIG. 15 is a detailed view showing an example of a fitting method according to the embodiment of the present disclosure.

Then, as illustrated in FIG. 15, for example, the processor 10 and the storage 12 specifies and stores the contour point group data of the first object belonging to the range of the comparative object setting range S as the feature point data of the first object, and specify and stores the point group data of the second object belonging to the range of the comparative object setting range S as the feature point data of the second object.

The comparison method between the feature point data of each object is as follows as an example. As illustrated in FIG. 15, for example, the processor 10 calculates the distance L to each feature point data of the second object included in the circle from the center point of the circle consisting of the search range radius R of the predetermined range centering on each of the feature point data of the first object, and for example, the processor 10 calculates the average value of the shortest distance L from each of the feature point data of the first object, or the average value of all the distance L. Then, for example, the processor 10 moves the point group data of the second object and calculates the average value again. This is executed a plurality of times, and for example, the processor 10 confirms or calculates the amount of movement of the point group data of the second object when the average value is the smallest. Finally, for example, the storage 12 stores the movement amount as the displacement amount of the positional deviation. When executing a plurality of times, the number of times may be, for example, set by the user in advance to a predetermined number of times. It may end when the average value becomes equal to or less than a predetermined value set in advance by the user.

Finally, based on the deviation amount, for example, the processor 10 corrects the tool trajectory information for the first object to the position of the second object by using the deviation amount, which makes the tool trajectory suitable for the second object.

<Other Examples of Fitting>

In addition to the above-mentioned fitting method, for example, among the contour point group data shown in FIG. 5, the point data of the feature portion (for example, the corner portion) constituting the object is further stored as the feature point data in the contour point group data storage unit 122. By comparing the feature point data of both, the deviation in the sensor coordinate system may be determined. Based on this, the positional deviation of the tool control information is corrected. Consequently, as in the above specific example, it is possible to draw a tool trajectory that matches with the position of the actual object, but it is not necessary to execute the tool control information acquisition process (SQ104) again, and it is possible to easily correct the positional position.

After the deviation correction by comparison of the feature point data, at least the contour point group data of the first object stored as the tool position and the point group data of the second object acquired before the corresponding work are further compared. If there is point data in which the position is displaced by a predetermined distance or more even after the correction, the tool control information calculation SQ104 can be executed again. Alternatively, the tool control information calculation SQ104 can be executed again only within the range of the tool control information corresponding to the point data in which the positional deviation occurs by a predetermined distance or more. Consequently, a tool trajectory can be drawn along the actual shape, especially when working on objects with similar shapes. Since it is not necessary to execute the tool control information calculation SQ104 every time, the processing load and the work time are further reduced.

Although the present embodiment has been described above, the above-described embodiment is merely an example for facilitating the understanding of the present invention, and should not be construed as limiting the present disclosure. The present disclosure can make some modifications and improvements without departing from the spirit thereof, and the present disclosure includes an equivalent thereof.

DESCRIPTION OF REFERENCE NUMERALS

1: terminal
2: working robot
21: arm
22: tool
23: sensor

The invention claimed is:

1. An information processing method comprising:
acquiring first three-dimensional point group data by a sensor from a first object;
specifying first contour point group data that constitutes an entire contour of the first object from the first three-dimensional point group data, based on a mutual positional relationship of point data within the first three-dimensional point group data;
specifying predetermined point data among the first contour point group data as point data of a reference point in a comparative object setting range that defines a predetermined range including at least the reference point;
storing the first contour point group data belonging to the predetermined range as feature point data of the first object;
acquiring a second three-dimensional point group data by a sensor from a second object;
storing second contour point group data belonging to the predetermined range as feature point data of the second object; and
comparing the feature point data of the first object with the feature point data of the second object to calculate a deviation amount,
wherein the reference point is a center point of the comparative object setting range; and
the comparative object setting range is a range constituted of a spherical body having a predetermined radius from point data of the center point, and
wherein the method further comprises:
acquiring tool control information including tool position information and tool posture information for specifying a tool trajectory of a tool connected to an arm of a working robot based on at least the first contour point group data; and
controlling the tool based on the tool control information, wherein the acquiring of the tool control information comprises setting a moving range of the tool.

2. The information processing method according to claim 1,
wherein the acquiring of the tool control information comprises acquiring the tool position information by specifying the first contour point group data within the moving range of the tool as a tool position coarsely in a straight line portion and densely in a curved portion.

3. The information processing method according to claim 1,
wherein the specifying of the first contour point group data comprises:
selecting one point data from the first three-dimensional point group data;
drawing a line segment from the selected point data for each of points contained inside a circle having a predetermined radius centering on the selected point data;
calculating an angle formed by two line segments adjacent to each other in a predetermined rotation direction centering on the selected point data among a plurality of line segments;
comparing the calculated angle with a set value;
determining the selected point data as the first contour point group data when it is determined that the calculated angle is larger than the set value.

4. An information processing method comprising:
acquiring three-dimensional point group data by a sensor from an object;
specifying contour point group data that constitutes a contour of the object from the three-dimensional point group data;
acquiring tool control information including tool position information and tool posture information for specifying a tool trajectory of a tool connected to an arm of a working robot from the contour point group data;
controlling the tool based on the tool control information;
storing feature point data in the contour point group data,
wherein the object is a first object, and an object different from the first object is a second object,
wherein the method further comprises acquiring three-dimensional point group data from the second object, specifying contour point group data, and storing feature point data,
wherein the feature point data of the first object is compared with the feature point data of the second object to calculate an amount of deviation, and a positional deviation of coordinate data relating to the first object is corrected based on the amount of deviation, and
wherein the storing of the feature point data comprises:
specifying predetermined point data of the contour point group data of the first object as point data of a center point of a comparative object setting range that defines a predetermined range including at least the center point;
storing the contour point group data of the first object belonging to the predetermined range as the feature point data of the first object; and
storing the point group data of the second object belonging to the predetermined range as the feature point data of the second object.

5. The information processing method according to claim 4,
wherein the acquiring of the tool control information comprises:
setting a moving range of the tool; and
acquiring the tool position information by specifying the contour point group data within the moving range of the tool as a tool position for each fixed number.

6. The information processing method according to claim 5,
wherein the acquiring of the tool control information further comprises:
calculating a surface normal vector of point data specified as the tool position, and
acquiring a direction of the surface normal vector as tool posture information in the point data.

7. The information processing method according to claim 4,
wherein the acquiring of the tool control information comprises:
setting a moving range of the tool; and
acquiring the tool position information by specifying the contour point group data within the moving range of the tool as a tool position coarsely in a straight line portion and densely in a curved portion.

8. The information processing method according to claim 4, further comprising:
editing the tool position information or the tool posture information.

9. The information processing method according to claim 4,
wherein a position deviation of the tool position information is corrected as the correction of the position deviation.

10. An information processing system, comprising:
a three-dimensional point group data acquisition unit that acquires first three-dimensional point group data by a sensor from a first object and acquires second three-dimensional point group data by a sensor from a second object;
a boundary processing unit that specifies first contour point group data that constitutes a contour of the entire first object from the first three-dimensional point group data, based on a mutual positional relationship of point data within the first three-dimensional point group data;
a correction control unit, which:
specifies predetermined point data among the first contour point group data as point data of a reference point in a comparative object setting range that defines a predetermined range including at least the reference point;
stores the first contour point group data belonging to the predetermined range as feature point data of the first object;
stores the second three-dimensional point group data belonging to the predetermined range as feature point data of the second object; and
calculates an amount of deviation by comparing the feature point data of the first object with the feature point data of the second object;
a tool control unit that acquires tool control information including tool position information and tool posture information for specifying a tool trajectory of a tool connected to an arm of a working robot based on at least the first contour point group data,
wherein the tool control unit controls the tool based on the tool control information.

11. An information processing system, comprising:
a three dimensional point group data acquisition unit that acquires three dimensional point group data by a sensor from an object;
a boundary processing unit that specifies contour point group data that constitutes a contour of the object from the three-dimensional point group data; and
a tool control unit that acquires tool control information including tool position information and tool posture information for specifying a tool trajectory of a tool connected to an arm of a working robot from the contour point group data, and controls the tool based on the tool control information,
wherein the object includes a first object and a second object which is different from the first object,
wherein the system further comprises a contour point group data storage unit which:
specifies predetermined point data of contour point group data of the first object as point data of a center point of a comparative object setting range that defines a predetermined range including at least the center point;
stores the contour point group data of the first object belonging to the predetermined range as feature point data of the first object; and
stores point group data of the second object belonging to the predetermined range as feature point data of the second object,
wherein the feature point data of the first object is compared with the feature point data of the second object to calculate an amount of deviation, and a positional deviation of coordinate data relating to the first object is corrected based on the amount of deviation.

* * * * *